(12) United States Patent
Dumigan

(10) Patent No.: US 9,079,459 B2
(45) Date of Patent: Jul. 14, 2015

(54) TIRE WITH TREAD INCLUDING RIB HAVING CHAMFERED SURFACE

(75) Inventor: Keith Dumigan, Akron, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 1643 days.

(21) Appl. No.: 11/672,280

(22) Filed: Feb. 7, 2007

(65) Prior Publication Data
US 2008/0185084 A1 Aug. 7, 2008

(51) Int. Cl.
| B29C 33/42 | (2006.01) |
| B60C 11/04 | (2006.01) |
| B60C 11/13 | (2006.01) |
| B60C 11/11 | (2006.01) |
| B60C 11/03 | (2006.01) |
| B29L 30/00 | (2006.01) |

(52) U.S. Cl.
CPC ............... B60C 11/11 (2013.01); B29C 33/424 (2013.01); B60C 11/0306 (2013.01); B60C 11/04 (2013.01); B60C 11/1315 (2013.01); B60C 11/1392 (2013.01); B29L 2030/002 (2013.01)

(58) Field of Classification Search
CPC B60C 11/1392; B60C 11/1315; B60C 11/04; B29C 33/424
USPC .......... 152/209.15, 209.21, 209.24; 425/28.1, 425/46
See application file for complete search history.

(56) References Cited

U.S. PATENT DOCUMENTS

| 2,843,172 | A | * | 7/1958 | Berry et al. | 152/209.21 |
| 4,114,671 | A | * | 9/1978 | Maiocchi et al. | 152/209.21 |
| 4,387,754 | A | * | 6/1983 | Mirtain et al. | 152/901 |
| 4,423,760 | A | * | 1/1984 | Treves et al. | 152/209.21 |
| 5,234,326 | A | * | 8/1993 | Galli et al. | 425/46 |
| 5,690,761 | A | * | 11/1997 | Masaoka | 152/902 |
| 5,820,796 | A | * | 10/1998 | Howald et al. | 425/46 |
| 6,076,579 | A | * | 6/2000 | Matsumoto | 152/209.15 |
| 2005/0076986 | A1 | * | 4/2005 | Saguchi | 152/209.21 |
| 2005/0092413 | A1 | * | 5/2005 | Miyazaki | 152/209.24 |
| 2006/0032567 | A1 | * | 2/2006 | Oh | 152/209.18 |
| 2007/0006955 | A1 | * | 1/2007 | Fukunaga | 152/209.24 |

FOREIGN PATENT DOCUMENTS

| EP | 1075971 A1 | * | 2/2001 |
| JP | 01-204805 A | * | 8/1989 |
| JP | 09-011708 A | * | 1/1997 |
| JP | H0911708 | | 1/1997 |
| JP | 10-297220 | * | 11/1998 |

(Continued)

OTHER PUBLICATIONS

Machine translation for Japan 2003-211919 (no date).*
Machine translation for Japan 2002-240513 (no date).*
Machine translation for Japan 10-297220 (no date).*

(Continued)

*Primary Examiner* — Steven D Maki
(74) *Attorney, Agent, or Firm* — Shaun J. Fox; Bryan Jaketic

(57) ABSTRACT

This application discloses a tire comprising a circumferential tread including at least one tread element having a top surface, at least one edge, and at least one chamfered surface extending between the top surface and the edge. The chamfered surface is oriented at an angle relative to the top surface of the tread element that varies along the length of the chamfered surface. Alternatively, the chamfered surface may have a width and a height that vary along their respective lengths.

20 Claims, 6 Drawing Sheets

(56) References Cited

FOREIGN PATENT DOCUMENTS

| | | | | |
|---|---|---|---|---|
| JP | 10-315711 | A | * | 12/1998 |
| JP | 2002-240513 | | * | 8/2002 |
| JP | 2003-146024 | A | * | 5/2003 |
| JP | 2003-211919 | | * | 7/2003 |
| JP | 2005-112085 | A | * | 4/2005 |
| WO | 2004/106091 | | * | 12/2004 |

OTHER PUBLICATIONS

Machine translation for Japan 09-011708 (no date).*
Machine translation for Japan 2003-146024 (no date).*
Machine translation for Japan 10-315711 (no date).*
Machine translation for Japan 2005-112085 (no date).*
Office Action; Canadian Patent Application No. 2,619,633; Canadian Patent and Trademark Office; Feb. 14, 2014.

* cited by examiner

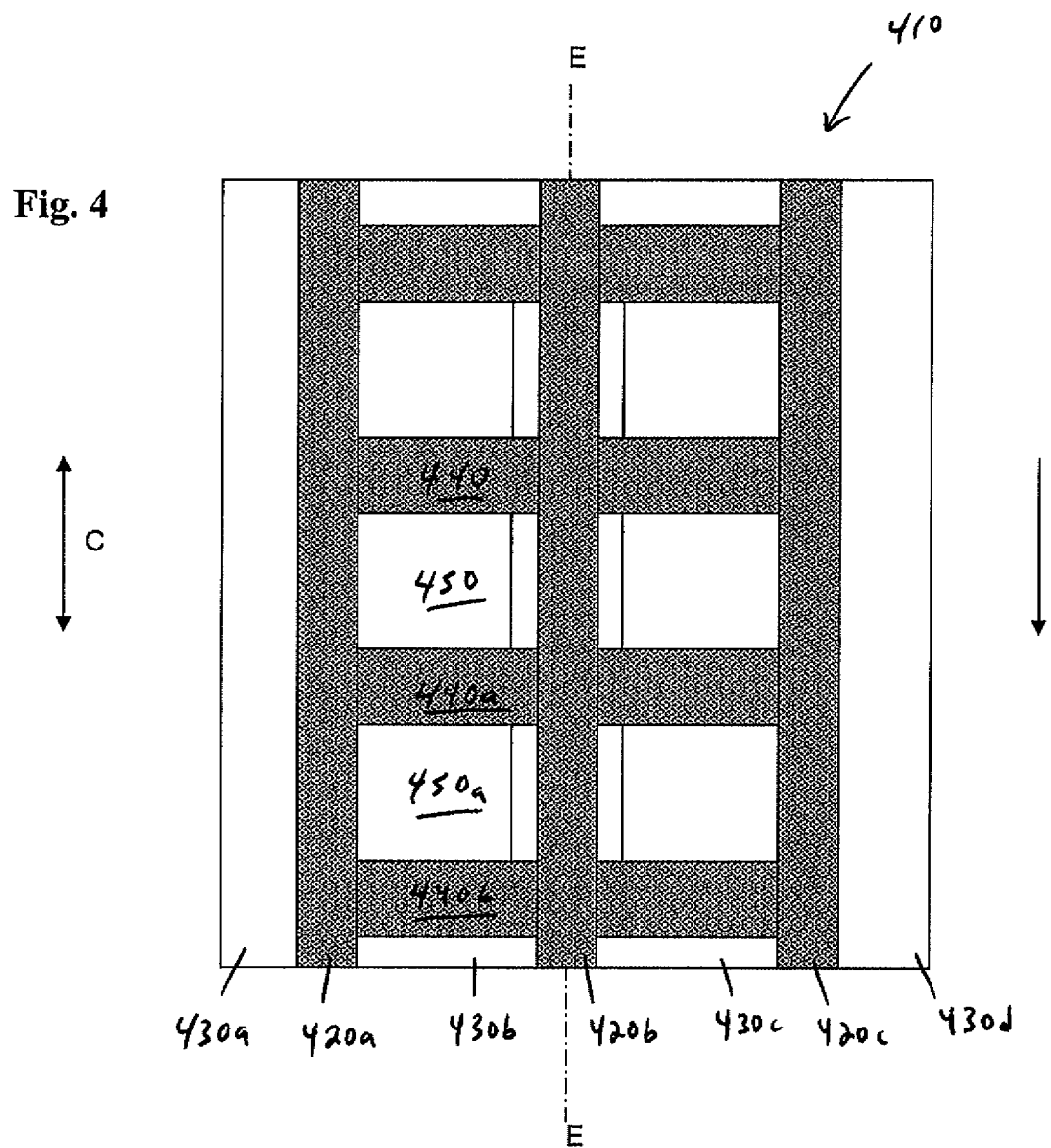

TIRE WITH TREAD INCLUDING RIB HAVING CHAMFERED SURFACE

FIELD OF THE INVENTION

The present application relates to a tire and, more particularly, to a tire tread having tread elements with at least one chamfered edge.

BACKGROUND

Pneumatic tires generally have a circumferential tread with circumferential grooves that define ribs therebetween. There may be slots in the ribs and the combination of grooves and slots may form tread elements called tread "blocks" or "lugs." Ribs and blocks may have a variety of different sizes and shapes. Tire treads may have different numbers of ribs and blocks that may be distributed in the tread to form a variety of different tread patterns.

There are many variables that may affect tire performance. For example, increasing the void area may improve wet performance. In addition, increasing tread stiffness may improve dry handling and wear resistance.

SUMMARY

This application discloses a tire comprising a circumferential tread including at least one rib, the rib having a top surface, at least one side surface oriented at zero degrees with respect to the radial direction, and at least one chamfered surface extending from the top surface when the tire is new. The chamfered surface extends between the top surface and the side surface such that the chamfered surface forms a first linear edge with the top surface and a second linear edge with the side surface. The chamfered surface has a variable width and a constant height along its length.

This application also discloses a circumferential tread of a tire, where the tread includes at least one rib. The rib has at least one sidewall that is substantially straight and continuous around the entire circumferential tread. The sidewall is oriented at zero degrees with respect to the radial direction. The rib also has at least one chamfer that extends from a top surface of the rib along at least a portion of the sidewall when the tire is new. The chamfer extends between the top surface and a side surface of the rib such that the chamfered surface forms a first linear edge with the top surface and a second linear edge with the side surface. The chamfer has a height less than a height of the rib. The angle and a width of the chamfer vary along a length of the chamfer.

Additionally, this application discloses a tire vulcanization mold comprising a mold housing having tread imparting structure configured to form a tread in a green tire. The tread imparting structure has a base surface, at least one side surface oriented at zero degrees with respect to a radial direction, and a chamfer-forming surface extending from the base surface to the side surface such that the chamfer-forming surface forms a first linear edge with the base surface and a second linear edge with the side surface. The chamfer-forming surface has a height less than a height of the tread imparting structure. The base surface extends along an entire inner circumference of the mold housing at a substantially uniform height, such that the base surface is configured to form a top surface of a rib in the green tire. The chamfer-forming surface is oriented at an angle relative to the base surface that varies along a length of the chamfer-forming surface. The chamfer-forming surface has a constant height along its length.

BRIEF DESCRIPTION OF THE DRAWINGS

The accompanying drawings, which are incorporated in and constitute a part of the specification, illustrate various examples that, together with the detailed description given below, serve to describe some example embodiments. The drawings are for the purposes of understanding and illustrating the preferred and some alternative embodiments and are not to be construed as limitations.

Further, in the accompanying drawings and descriptions that follow, like parts or features are normally indicated throughout the drawings and description with the same reference numerals, respectively. The figures are not necessarily drawn to scale and the proportions of certain parts or features may be exaggerated for convenience of illustration. Some of the drawings have dimensions indicated therein.

FIG. 4 illustrates a top plan view of another embodiment of a tire tread 410.

DETAILED DESCRIPTION

Figure 1:
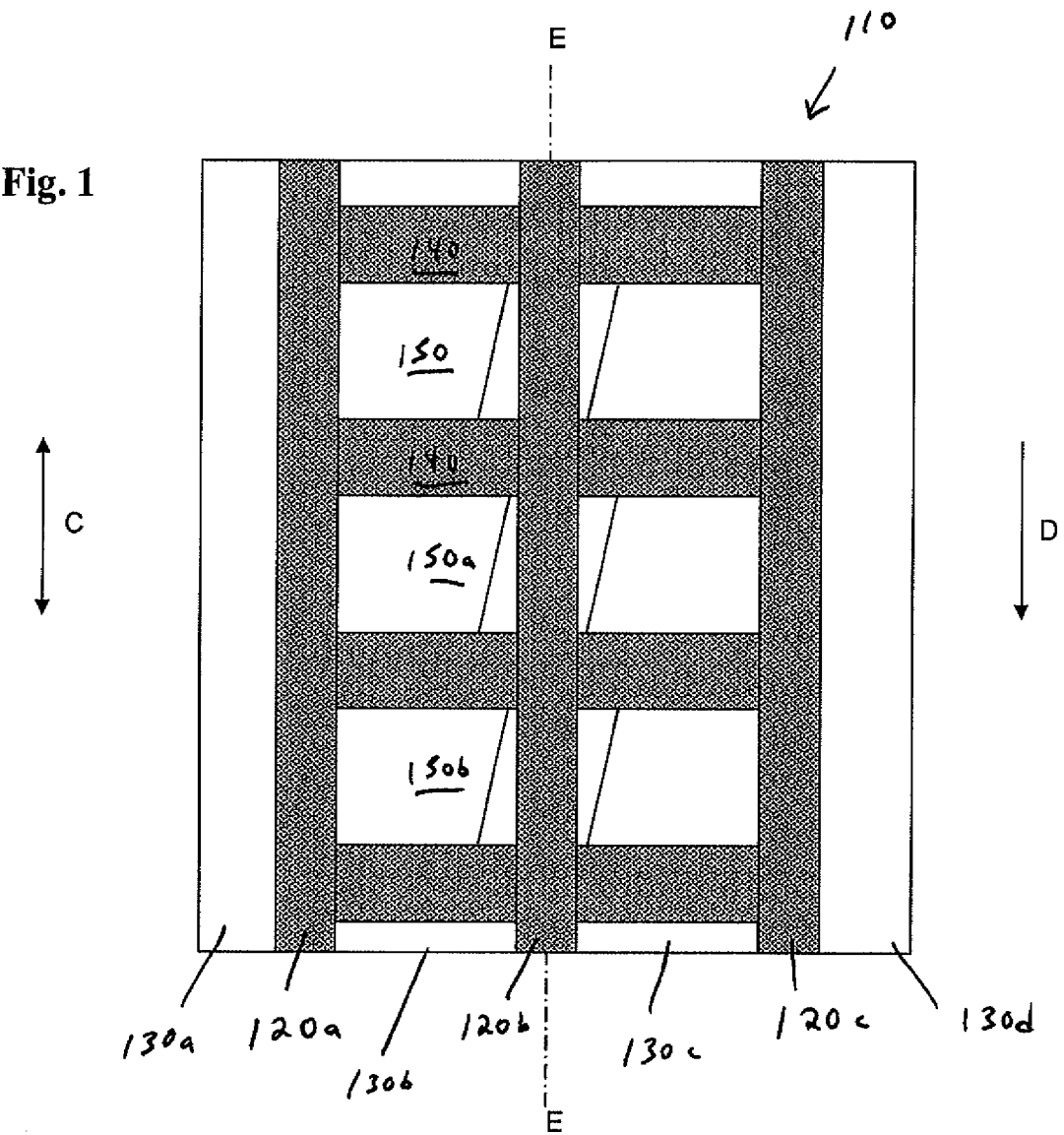
FIG. 1 illustrates a top plan view of one embodiment of a tire tread 110.

The following includes definitions of selected terms that may be used herein. The definitions include various examples and/or forms of components that fall within the scope of a term and that may be used for implementation. The examples are not intended to be limiting.

"Axial" or "axially" refer to a direction that is parallel to the axis of rotation of a tire.

"Circumferential" and "circumferentially" refer to lines or directions extending along the perimeter of the surface of the tread parallel to the equatorial plane and perpendicular to the axial direction of the tire.

"Edge," as used herein, generally refers to a part of a tread element adjacent to a void, like a groove or slot.

"Equatorial plane" refers to the plane that is perpendicular to the tire's axis of rotation and passes through the center of the tire's tread.

"Groove" refers to an elongated void area in the tread of the tire that extends circumferentially in a straight, curved, wavy, zig-zag, or any other non-straight manner.

"Lateral" or "laterally" refer to a direction along the tread of the tire going from one sidewall of the tire to the other sidewall.

"Radial" or "radially" refer to a direction that is perpendicular to the axis of rotation of the tire.

"Rib" or "ribs" define the circumferential extending strip or strips of rubber on the tread that is bounded by one circumferential groove and either a second groove or a lateral edge of the tread.

"Sipe" refers to a thin slit formed in the surface of the tread that may extend laterally, circumferentially, or at an acute angle with respect to the circumferential direction of the tire. The sipe can be straight, curved, zig-zag, wavy, or take the form of any other non-straight configuration.

"Slot" refers to an elongated void in the tread of the tire that extends laterally or at an acute angle relative to the circumferential direction of the tire. The slot can be straight, curved, zig-zag, wavy, or take the form of any other non-straight configuration.

"Tread" refers to that portion of the tire that comes into contact with the road under normal loading.

"Tread element" generally refers to individual features of a tread that contact a road surface, such as ribs and blocks.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Illustrated in FIG. 1 is a top plan view of one embodiment of a tire tread 110 that extends in a circumferential direction C around the tire. The tread 110 is defined by three grooves 120a-c that extend circumferentially around the tire, thereby dividing the tread 110 into axially spaced-apart ribs 130a-d that extend circumferentially around the tire. The ribs 130 define, at least in part, the road engaging portion of the tire. In alternative embodiments (not shown), the tread 110 of the tire can include n number of circumferential grooves and n+1 number of circumferential ribs, where n is equal to 1 or more.

In the illustrated embodiment, the tread 110 is further defined by slots 140 that divide the ribs 130b,c into circumferentially spaced-apart tread blocks or lugs 150. As shown in FIG. 1, the slots 140 are substantially rectilinear and oriented substantially perpendicular to an equatorial plane E of the tire.

With reference to FIG. 1, the blocks 150 are rectangular in shape when viewed from the top. The blocks 150, however, may take the form of a variety of shapes, and the tire tread may include blocks having the same shape or different shapes. Moreover, the blocks of the tire tread may all be of the same size or may be of different sizes.

Figure 2A:
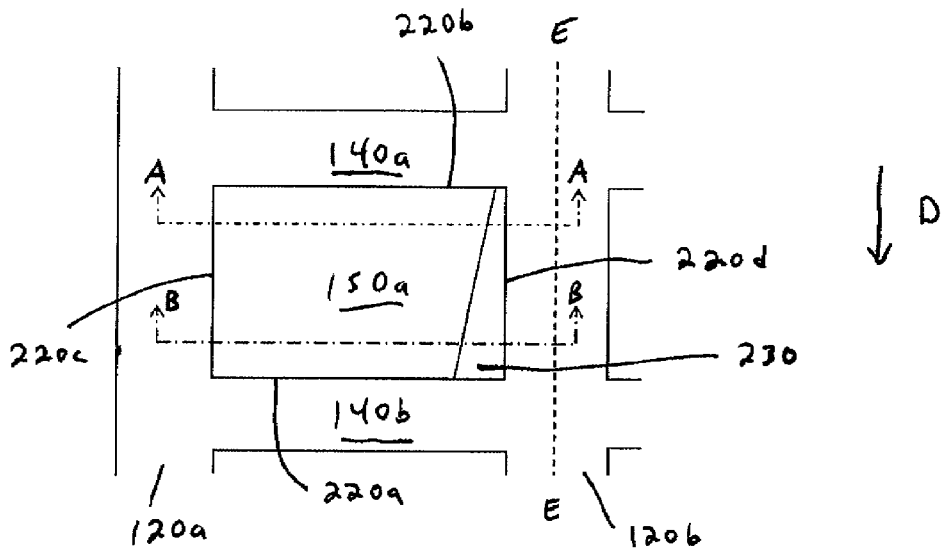
FIG. 2A illustrates a fragmentary, plan view of one embodiment of a block 150a provided in the tread 110.

Illustrated in FIG. 2A is a fragmentary, top plan view of one embodiment of a block 150a provided in the tread 110 of the tire. As shown in FIG. 2A, the block 150a has a top surface 210 and edges or sides 220. More specifically, the edges 220 will be described with reference to a leading edge 220a, a trailing edge 220b, an outer edge 220c, and an inner edge 220d when the tire is rotated in the circumferential direction represented by arrow D. The leading and trailing edges 220a,b are defined by and communicate with slots 140b,a, respectively, while outer and inner edges 220c,d are defined by and communicate with grooves 120a,b, respectively.

In the illustrated embodiment, the shape of the block 150a is rectangular when viewed from the top, thereby providing four edges (i.e., edges 220a-d). In alternative embodiments (not shown), the block 150a may be triangular, square, trapezoidal, other regular polygonal, or other complex shape. In other embodiments (not shown), the block 150a may include one or more curved edges and take the form of a circle, oval, semi-circle, or other complex shape having at least one curved edge. In this case, the block 150a may have as little as one edge (e.g., a circle).

As shown in FIG. 2A, the leading and trailing edges 220a,b of the block 150a are substantially rectilinear and oriented substantially perpendicular to the equatorial plane E of the tire, while the outer and inner edges 220c,d are substantially rectilinear and oriented substantially parallel to the equatorial plane E of the tire. In alternative embodiments (not shown), the leading and trailing edges 220a,b of the block 150a can be oriented at an acute angle relative to the equatorial plane E of the tire, while the outer and inner edges 220c,d can be oriented at an acute angle relative to the equatorial plane E of the tire.

Figure 2B:
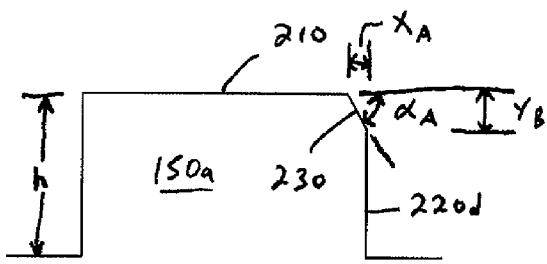
FIG. 2B illustrates a cross-sectional view of the block 150a taken along the line A-A.

As shown in FIG. 2A, the block 150a further includes a chamfer or chamfered surface 230 provided between the top surface 210 and the inner edge 220d of the block 150a. By definition, the chamfered surface 230 is oriented at an angle $\alpha$ relative to the top surface 210 of the block 150a as shown in FIG. 2B. The angle $\alpha$ of the chamfered surface 230 can be, for example, between 0° and 90° at any point along the circumferential length of the chamfered surface 230. Although the block 150a illustrated in FIG. 2A includes only one chamfered surface (i.e., chamfered surface 230), the block 150a can include: (i) a chamfered surface between the top surface 210 and the outer edge 220c; (ii) a chamfered surface between the top surface 210 and the leading edge 220a; (iii) a chamfered surface between the top surface 210 and the trailing edge 220b; and (iv) combinations thereof. Furthermore, although the chamfered surface 230 extends along the entire inner edge 220d of the block 150a as shown in FIG. 2A, the chamfered surface may only extend along a portion of the edges.

Figure 2C:
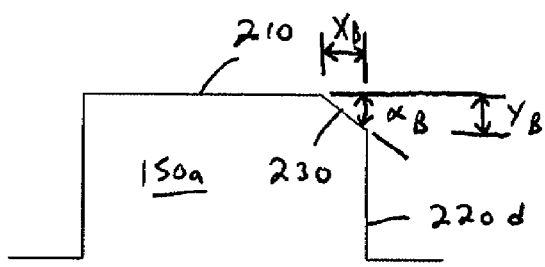
FIG. 2C illustrates a cross-sectional view of the block 150a taken along the line B-B.

The chamfered surface 230 is oriented at an angle $\alpha$ that changes along the circumferential length of the chamfered surface 230. In the illustrated embodiment, the angle $\alpha$ decreases in the rotation direction D of the tire. To better illustrate this point, FIGS. 2B and 2C show a cross-section of the block 150a taken along lines A-A and B-B, respectively. As shown in these figures, the angle $\alpha_A$ of the chamfered surface 230 (FIG. 2B) is greater than the angle $\alpha_B$ of the chamfered surface 230 (FIG. 2C). In another embodiment (not shown), the angle $\alpha$ may increase in the rotation direction C of the tire.

The lateral width X of the chamfered surface 230 also changes along the circumferential length of the chamfered surface 230. In the illustrated embodiment, the lateral width X of the chamfered surface 330 increases in the rotation direction C of the tire. As shown in FIGS. 2B and 2C, the lateral width $X_A$ of the chamfered surface 230 (FIG. 2B) is less than the lateral width $X_B$ of the chamfered surface 230 (FIG. 2C). In another embodiment (not shown), the lateral width X may decrease in the rotation direction C of the tire.

Unlike the angle $\alpha$ and the lateral width X of the chamfered surface 230, the radial height Y of the chamfered surface 230 remains constant along the circumferential length of the block 150a. As shown in FIGS. 2B and 2C, the radial height $Y_A$ of the chamfered surface 230 (FIG. 2B) is equal to the radial height $Y_B$ of the chamfered surface 230 (FIG. 2C). In another embodiment (not shown), the radial height Y may vary along the circumferential length of the block 150a.

As shown in FIGS. 2B and 2C, the block 150a has an overall height h measured from the top surface 210 of the block 150a to the base of the groove 120a. In one embodiment, the height h of the block 150a may be between about 6 and about 15 millimeters (mm). Of course, the height of the block 150a may be dimensioned differently in other embodiments. In one embodiment, the radial height Y of the chamfered surface 230 is less than 50% of the height h of the block 150a. In other embodiments, the radial height Y of the chamfered surface 230 can be less than 85% of the height h of the block 150a.

Figure 3A:
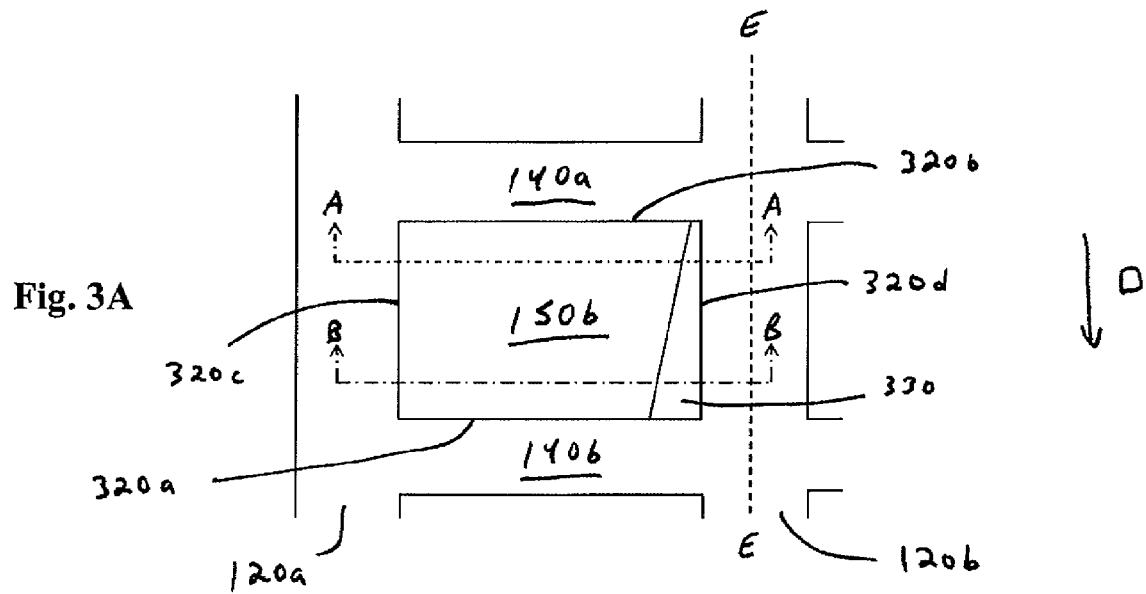
FIG. 3A illustrates a fragmentary, plan view of another embodiment of a block 150b provided in the tread 110.

Illustrated in FIG. 3A is a fragmentary, top plan view of another embodiment of a block 150b provided in the tread 110 of the tire. As shown in FIG. 3A, the block 150b has a top surface 310 and edges or sides 320. More specifically, the edges 320 will be described with reference to a leading edge 320a, a trailing edge 320b, an outer edge 320c, and an inner edge 320d when the tire is rotated in the circumferential direction represented by arrow D. The leading and trailing edges 320a,b are defined by and communicate with slots 140b,a, respectively, while outer and inner edges 320c,d are defined by and communicate with grooves 120a,b, respectively.

In the illustrated embodiment, the shape of the block 150b is rectangular when viewed from the top, thereby providing four edges (i.e., edges 320a-d). In alternative embodiments (not shown), the block 150b may be triangular, square, trapezoidal, other regular polygonal, or other complex shape. In other embodiments (not shown), the block 150b may include one or more curved edges and take the form of a circle, oval, semi-circle, or other complex shape having at least one curved edge. In this case, the block 150b may have as little as one edge (e.g., a circle).

As shown in FIG. 3A, the leading and trailing edges 320a,b of the block 150b are substantially rectilinear and oriented substantially perpendicular to the equatorial plane E of the tire 100, while the outer and inner edges 320c,d are substantially rectilinear and oriented substantially parallel to the equatorial plane E of the tire. In alternative embodiments (not shown), the leading and trailing edges 320a,b of the block 150b can be oriented at an acute angle relative to the equatorial plane E of the tire, while the outer and inner edges 320c,d can be oriented at an acute angle relative to the equatorial plane E of the tire.

Figure 3B:
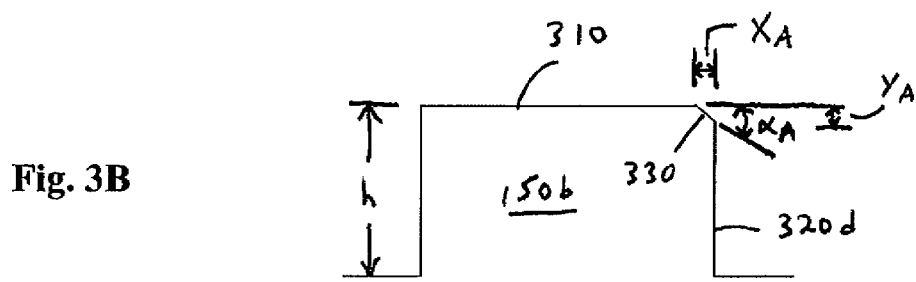
FIG. 3B illustrates a cross-sectional view of the block 150b taken along the line A-A.

As shown in FIG. 3A, the block 150b further includes a chamfer or chamfered surface 330 provided between the top surface 310 and the inner edge 320d of the block 150b. By definition, the chamfered surface 330 is oriented at an angle $\alpha$ relative to the top surface 310 of the block 150b as shown in FIG. 3B. The angle $\alpha$ of the chamfered surface 330 can be, for example, between 0° and 90° at any point along the circumferential length of the chamfered surface 330. Although the block 150b illustrated in FIG. 3A includes only one chamfered surface (i.e., chamfered surface 330), the block 150b can include: (i) a chamfered surface between the top surface 310 and the outer edge 320c; (ii) a chamfered surface between the top surface 310 and the leading edge 320a; (iii) a chamfered surface between the top surface 310 and the trailing edge 320b; and (iv) combinations thereof.

Figure 3C:
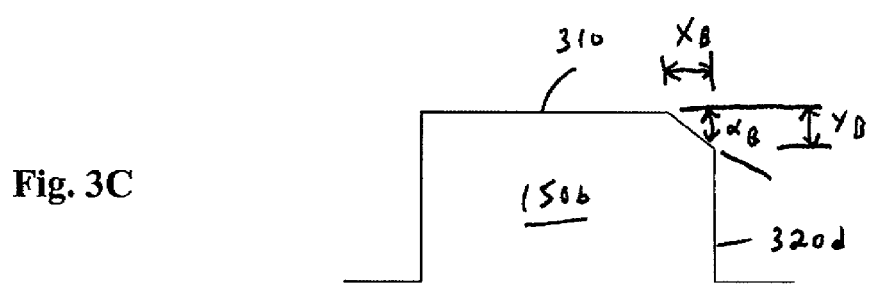
FIG. 3C illustrates a cross-sectional view of the block 150b taken along the line B-B.

In the illustrated embodiment, the chamfered surface 330 is oriented at an angle $\alpha$ that remains constant along the circumferential length of the chamfered surface 330. To better illustrate this point, FIGS. 3B and 3C show a cross-section of the block 150b taken along lines A-A and B-B, respectively. As shown in these figures, the angle $\alpha_A$ of the chamfered surface 330 taken along the plane A-A (FIG. 3B) is equal to the angle $\alpha_B$ of the chamfered surface 330 taken along the plane B-B (FIG. 3C).

Unlike the angle $\alpha$ of the chamfered surface 330, the lateral width X of the chamfered surface 330 changes along the circumferential length of the chamfered surface 330. Specifically, in the illustrated embodiment, the lateral width X of the chamfered surface 330 increases in the rotation direction C of the tire 100. As shown in FIGS. 3B and 3C, the lateral width $X_A$ of the chamfered surface 330 (FIG. 3B) is less than the lateral width $X_B$ of the chamfered surface 330 (FIG. 3C). In another embodiment (not shown), the lateral width X may decrease in the rotation direction C of the tire 100.

Like the lateral width X of the chamfered surface 330, the radial height Y of the chamfered surface 330 changes along the circumferential length of the chamfered surface 330. Specifically, in the illustrated embodiment, the radial height Y of the chamfered surface 330 increases in the rotation direction C of the tire. As shown in FIGS. 3B and 3C, the radial height $Y_A$ of the chamfered surface 330 (FIG. 3B) is greater less than the radial height $Y_B$ of the chamfered surface 330 (FIG. 3C). In another embodiment (not shown), the radial height Y may decrease in the rotation direction C of the tire.

As shown in FIGS. 3B and 3C, the block 150b has an overall height h measured from the top surface 310 of the block 150b to the base of the groove 120a. In one embodiment, the height h of the block 150b may be between about 6 and about 15 millimeters (mm). Of course, the height of the block 150b may be dimensioned differently in other embodiments. In one embodiment, the radial height Y of the chamfered surface 330 is less than 50% of the height h of the block 150b. In other embodiments, the radial height Y of the chamfered surface 330 can be less than 85% of the height h of the block 150b.

Illustrated in FIG. 4 is a top plan view of one embodiment of a tire tread 410 that extends in a circumferential direction C around the tire. The tread 410 is defined by three grooves 420a-c that extend circumferentially around the tire, thereby dividing the tread 410 into axially spaced-apart ribs 430a-d that extend circumferentially around the tire. The ribs 430 define, at least in part, the road engaging portion of the tire. In alternative embodiments (not shown), the tread 410 of the tire can include n number of circumferential grooves and n+1 number of circumferential ribs, where n is equal to 1 or more.

In the illustrated embodiment, the tread 410 is further defined by slots 440 that divide the ribs 430b,c into circumferentially spaced-apart tread blocks or lugs 450. As shown in FIG. 4, the slots 440 are substantially rectilinear and oriented substantially perpendicular to an equatorial plane E of the tire.

With reference to FIG. 1, the blocks 450 are rectangular in shape when viewed from the top. The blocks 450, however, may take the form of a variety of shapes, and the tire tread may include blocks having the same shape or different shapes. Moreover, the blocks of the tire tread may all be of the same size or may be of different sizes.

Figure 5A:
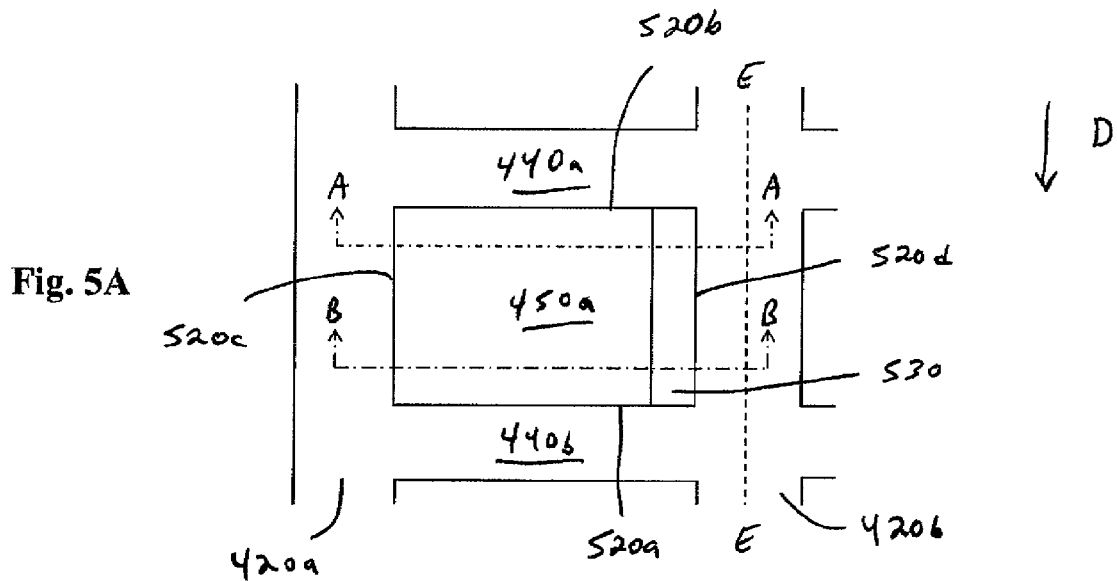
FIG. 5A illustrates a fragmentary, plan view of one embodiment of a block 150a provided in the tread 410.

Illustrated in FIG. 5A is a fragmentary, top plan view of another embodiment of a block 450a provided in the tread 410 of the tire. As shown in FIG. 5A, the block 450a has a top surface 510 and edges or sides 520. More specifically, the edges 520 will be described with reference to a leading edge 520a, a trailing edge 520b, an outer edge 520c, and an inner edge 520d when the tire is rotated in the circumferential direction represented by arrow C. The leading and trailing edges 520a,b are defined by and communicate with slots 440b,a, respectively, while outer and inner edges 520c,d are defined by and communicate with grooves 420a,b, respectively.

In the illustrated embodiment, the shape of the block 450a is rectangular when viewed from the top, thereby providing four edges (i.e., edges 520a-d). In alternative embodiments (not shown), the block 450a may be triangular, square, trapezoidal, other regular polygonal, or other complex shape. In other embodiments (not shown), the block 150c may include one or more curved edges and take the form of a circle, oval, semi-circle, or other complex shape having at least one curved edge. In this case, the block 450a may have as little as one edge (e.g., a circle).

As shown in FIG. 5A, the leading and trailing edges 520a,b of the block 450a are substantially rectilinear and oriented substantially perpendicular to the equatorial plane E of the tire 100, while the outer and inner edges 520c,d are substantially rectilinear and oriented substantially parallel to the equatorial plane E of the tire. In alternative embodiments (not shown), the leading and trailing edges 520a,b of the block 450a can be oriented at an acute angle relative to the equatorial plane E of the tire, while the outer and inner edges 520c,d can be oriented at an acute angle relative to the equatorial plane E of the tire.

Figure 5B:
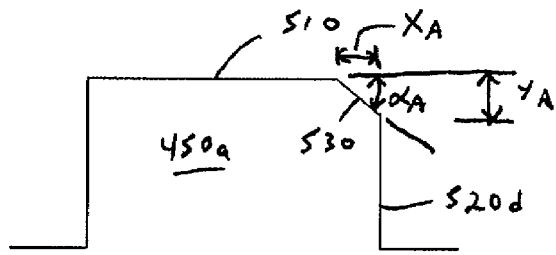
FIG. 5B illustrates a cross-sectional view of the block 450a taken along the line A-A.

As shown in FIG. 5A, the block 450a further includes a chamfer or chamfered surface 530 provided between the top surface 510 and the inner edge 520d of the block 450a. By definition, the chamfered surface 530 is oriented at an angle α relative to the top surface 510 of the block 450a as shown in FIG. 5B. The angle α of the chamfered surface 530 can be, for example, between 0° and 90° at any point along the circumferential length of the chamfered surface 530. Although the block 450a illustrated in FIG. 5A includes only one chamfered surface (i.e., chamfered surface 530), the block 450a can include: (i) a chamfered surface between the top surface 510 and the outer edge 520c; (ii) a chamfered surface between the top surface 510 and the leading edge 520a; (iii) a chamfered surface between the top surface 510 and the trailing edge 520b; and (iv) combinations thereof.

Figure 5C:
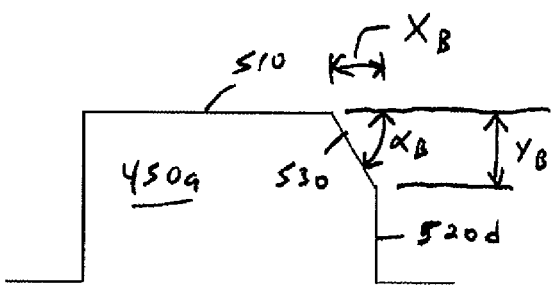
FIG. 5C illustrates a cross-sectional view of the block 450a taken along the line B-B.

The chamfered surface 530 is oriented at an angle α that changes along the circumferential length of the chamfered surface 530. In the illustrated embodiment, the angle α increases in the rotation direction C of the tire. To better illustrate this point, FIGS. 5B and 5C show a cross-section of the block 450a taken along lines A-A and B-B, respectively. As shown in these figures, the angle $α_A$ of the chamfered surface 530 (FIG. 5B) is greater less than the angle $α_A$ of the chamfered surface 530 (FIG. 5C). In another embodiment (not shown), the angle α may decrease in the rotation direction C of the tire.

Unlike the angle α of the chamfered surface 530, the lateral width X of the chamfered surface 530 remains constant along the circumferential length of the block 450a. As shown in FIGS. 5B and 5C, the lateral width $X_A$ of the chamfered surface 530 (FIG. 5B) is equal to the lateral width $X_B$ of the chamfered surface 530 (FIG. 5C). In another embodiment (not shown), the lateral width X may vary along the circumferential length of the block 450a.

Like the angle α of the chamfered surface 530, the radial height Y of the chamfered surface 530 changes along the circumferential length of the chamfered surface 530. In the illustrated embodiment, the radial height Y of the chamfered surface 530 increases in the rotation direction C of the tire. As shown in FIGS. 5B and 5C, the radial height $Y_A$ of the chamfered surface 530 (FIG. 5B) is less than the radial height $Y_B$ of the chamfered surface 530 (FIG. 5C). In another embodiment (not shown), the radial height Y may decrease in the rotation direction C of the tire.

As shown in FIGS. 5B and 5C, the block 450a has an overall height h measured from the top surface 510 of the block 450a to the base of the groove 420a. In one embodiment, the height h of the block 450a may be between about 6 and about 15 millimeters (mm). Of course, the height of the block 450a may be dimensioned differently in other embodiments. In one embodiment, the radial height Y of the chamfered surface 530 is less than 50% of the height h of the block 450a. In other embodiments, the radial height Y of the chamfered surface 530 can be less than 85% of the height h of the block 450a.

Figure 6:
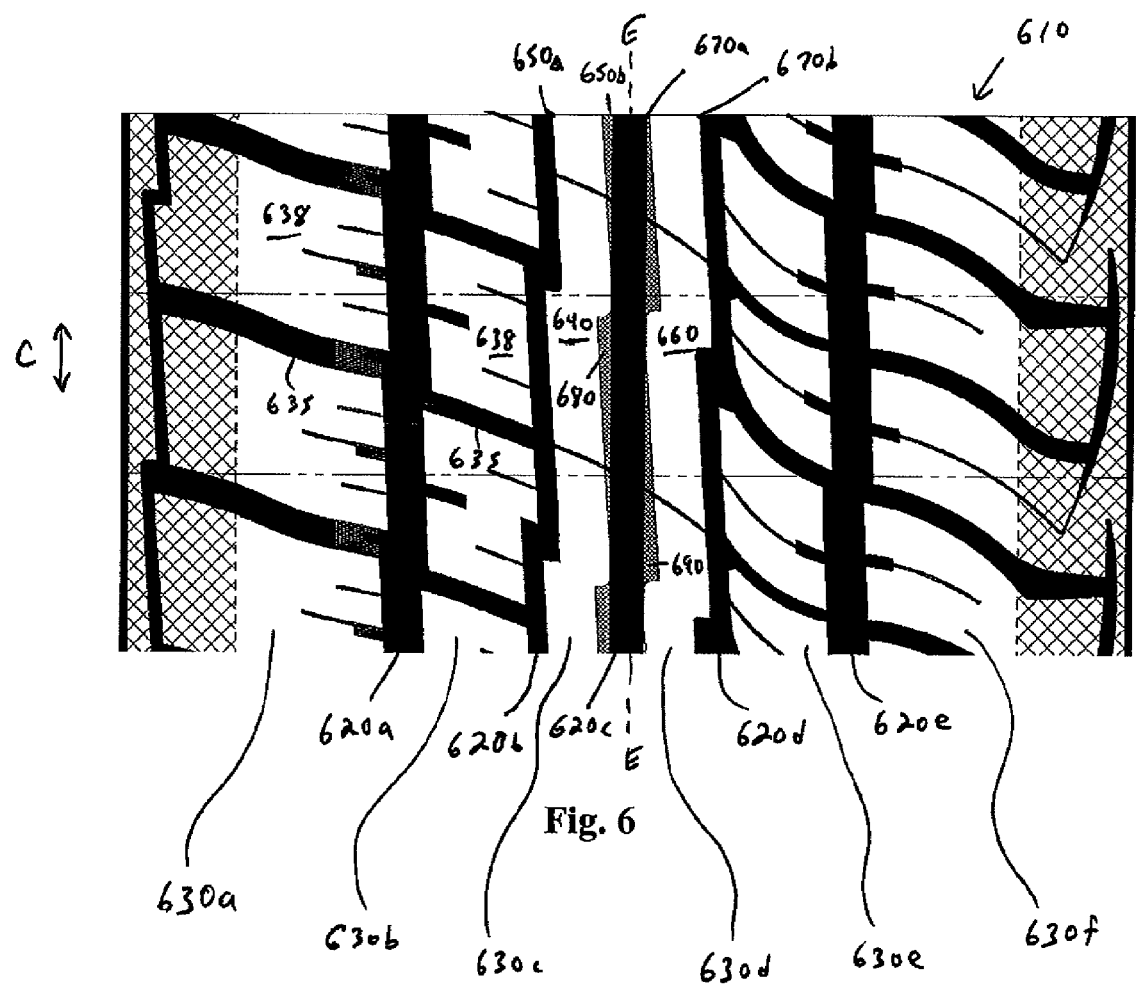
FIG. 6 illustrates a top plan view of another embodiment of a tire tread 610.

Although the tread elements discussed above and shown in the figures include only tread blocks, it is contemplated that the chamfered surfaces can also be provided in other tread elements such as ribs. Illustrated in FIG. 6 is a top plan view of one embodiment of a tire tread 610 that extends in a circumferential direction C around the tire. The tread 610 is defined by five grooves 620a-e that extend circumferentially around the tire, thereby dividing the tread 610 into axially spaced-apart ribs 630a-f that extend circumferentially around the tire. The ribs 630 define, at least in part, the road engaging portion of the tire. In alternative embodiments (not shown), the tread 610 of the tire can include n number of circumferential grooves and n+1 number of circumferential ribs, where n is equal to 1 or more. In the illustrated embodiment, the tread 610 is further defined by slots 635 that divide the ribs 630a,b,e,f into circumferentially spaced-apart tread blocks or lugs 638.

As shown in FIG. 6, the rib 630c has a top surface 640, outer circumferential edge 650a and inner circumferential edge 650b. Similarly, the rib 630d has a top surface 660, inner circumferential edge 670a and outer circumferential edge 670b. The rib 630c is laterally separate from the rib 630d by the groove 620c, along which the equatorial plane E of the tire passes.

In the illustrated embodiment, the inner edge 650b of the rib 630c includes a plurality of chamfers or chamfered surfaces 680 provided between the top surface 640 and the inner edge 650b of the rib 630c. Additionally, the inner edge 670b of the rib 630d includes a plurality of chamfers or chamfered surfaces 690 provided between the top surface 660 and the inner edge 670b of the rib 630d. The chamfered surfaces 680, 690 are substantially similar to the chamfered surface 230 described above and shown in FIGS. 2B and 2C in that the angle and lateral width are variable, while the radial height is fixed.

The tire treads discussed above are not limited to the embodiments discussed above and illustrated in the figures. The tread of the tire may be configured in any desired tread design or pattern without departing from the scope of this application. For example, one or more grooves and/or one or more ribs can have a substantially constant or uniform cross-section around the circumference of the tire. Alternatively, one or more grooves and/or one or more ribs can have a variable cross-section that extends around the circumference of the tire. Additionally, both edge portions of the grooves and/or both edge portions of the ribs can be symmetrical or asymmetrical. Furthermore, the ribs and/or blocks may include any combination of sipes, slots, etc. to form a wide variety of desired tread patterns.

The tire treads discussed above may contain any combination of tread elements including, but not limited to: ribs, blocks, ribs with chamfers along the entirety of one circumferential edge; ribs with chamfers along the entirety of both circumferential edges; ribs with chamfers along only a portion of one circumferential edge; ribs with chamfers along only a portion of both circumferential edges; blocks with chamfers along the entirety of one circumferential edge; blocks with chamfers along the entirety of both circumferential edges; blocks with chamfers along only a portion of one circumferential edge; blocks with chamfers along only a portion of both circumferential edges; blocks with chamfers along the leading and/or trailing edges; blocks with chamfers along the leading, trailing edges and/or circumferential edges.

By providing a chamfer along at least one edge of a tread element, several tire performance characteristics may be affected. For example, the addition of chamfers along an edge of a tread element may create additional "edges" that improve the traction of the tire. In one instance, the addition of a chamfer along the circumferential edge of a tread element creates an additional void area adjacent to the groove to improve wet handling performance by allowing more efficient water flow through the tread during operation on wet surfaces. It should be understood, however, that the larger the void area in the tread element, the smaller the ground contacting area, which results in less road surface contact and therefore decreased dry traction. Thus, the chamfer should be appropriately dimensioned taken into consideration, among other things, the desired tread surface area and resulting effects on wet and dry traction.

Additionally, the addition of a chamfer along the circumferential edge of a tread element can reduce irregular tread wear and potential traction loss during cornering. For example, when the circumferential edge of the tread element is formed at a right angle, the rubber may fold over at the edge during cornering. This causes irregular wear at the location of the fold over. Also as the rubber folds over there is a loss of contact area with the road surface thereby creating reduced traction. The chamfer along the circumferential edge may prevent the folding over of the tread edge and the resulting irregular wear and potential traction loss during cornering.

Moreover, by providing a chamfer along an edge of a tread element, the tire molding process can be improved. Tire vulcanization molds are provided with recesses and projections in order to impart the desired tread pattern to the tire during the tire vulcanization process. Occasionally, during the tire molding process, air becomes trapped in recesses of the mold that contain sharp edges (e.g., right angle corners). The trapped air prevents rubber from flowing completely into these sharp edges, which causes the resulting tire tread to have bubble-like voids (also known as "lightness") in areas that were intended to contain rubber. By providing a chamfer-forming surface in the mold, the flow of rubber in these recesses can be improved, thereby reducing the occurrence of lightness in the tread elements. Therefore, the resulting tire tread may be closer to the intended design.

The tires and tire treads described above and illustrated in FIGS. 1-6 can be produced in a variety of ways. One exemplary production method includes the use of a tire vulcanization mold. The mold includes tread-imparting structure configured to form a tread onto a green tire.

To impart tread elements with a chamfered edge described above (e.g., chamfered surfaces 230, 330, 530, 680, 690) into the tire tread, the tread-imparting structure includes specific structure that corresponds to the shape and dimensions of the tread elements with chamfered edges described above. For example, the tread element-forming component can include a base surface, at least one edge surface, and a chamfer-forming surface extending between the base surface and the edge surface. The chamfer-forming surface is oriented at an angle relative to the base surface of the tread element-forming component and the angle varies along the length of the chamfer-forming surface.

To produce the tire in the mold, a green tire is first placed in the mold. To support the green tire during the molding process, a high temperature and high pressure medium is charged into a bladder (not shown). As the mold is collapsed around the green tire, the tread-imparting structure is forced into the green tire, thereby forming the tire tread. In this manner, the tread element with a chamfered edge is formed in the outer surface of the tire tread.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto."

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A tire comprising:
a circumferential tread including at least one rib, the rib having a top surface, at least one side surface oriented at zero degrees with respect to the radial direction, and at least one chamfered surface extending from the top surface when the tire is new, wherein the chamfered surface extends between the top surface and the side surface such that the chamfered surface forms a first linear edge with the top surface and a second linear edge with the side surface, and wherein the chamfered surface has a variable width and a constant height along its length.

2. The tire of claim 1, wherein the angle of the chamfered surface gradually increases in a rotation direction of the tire.

3. The tire of claim 1, wherein the angle of the chamfered surface is between 0° and 90°.

4. The tire of claim 1, wherein the height of the chamfered surface is less than 85% of the height of the rib.

5. The tire of claim 1, wherein the at least one side surface includes an inner side surface and an outer side surface, wherein the inner side surface is closer to an equatorial plane of the tire than the outer side surface.

6. The tire of claim 5, wherein the at least one chamfered surface includes a plurality of chamfered surfaces.

7. The tire of claim 6, wherein the plurality of chamfered surfaces are disposed on the inner side surface.

8. The tire of claim 1, wherein the height of the chamfered surface is less than 50% of the height of the rib.

9. A tire comprising:
a circumferential tread including at least one rib, the rib having:
at least one sidewall that is substantially straight and continuous around the entire circumferential tread, wherein the sidewall is oriented at zero degrees with respect to the radial direction; and
at least one chamfer that extends from a top surface of the rib along at least a portion of the sidewall when the tire is new,
wherein the chamfer extends between the top surface and a side surface of the rib such that the chamfered surface forms a first linear edge with the top surface and a second linear edge with the side surface,
wherein the chamfer has a height less than a height of the rib, and
wherein the angle and a width of the chamfer vary along a length of the chamfer.

10. The tire of claim 9, wherein the width of the chamfer gradually increases in a rotation direction of the tire.

11. The tire of claim 9, wherein the angle of the chamfer is between 0° and 90°.

12. The tire of claim 9, wherein the at least one rib includes a first rib and a second rib, each of the first and second rib having at least one sidewall that is substantially straight and continuous around the entire circumferential tread and at least one chamfer that extends along at least a portion of the sidewall.

13. The tire of claim 8, wherein the chamfer has a height that is less than 85% of the height of the rib.

14. The tire of claim 9, wherein the at least one sidewall includes an inner sidewall and an outer sidewall, and wherein the at least one chamfer extends along the inner sidewall.

15. The tire of claim 9, wherein the at least one rib includes a first rib on a first side of an equatorial plane of the tire, and a second rib on a second side of the equatorial plane, opposite the first side.

16. The tire of claim 15, wherein the at least one sidewall of the first rib includes an inner sidewall and an outer sidewall, and wherein the at least one chamfer extends along the inner sidewall.

17. The tire of claim 16, wherein the at least one sidewall of the second rib includes an inner sidewall and an outer sidewall, and wherein the at least one chamfer extends along the inner sidewall.

18. The tire of claim 9, wherein the height of the chamfer is less than 50% of the height of the rib.

19. A tire vulcanization mold comprising:
a mold housing having tread imparting structure configured to form a tread in a green tire,
the tread imparting structure having a base surface, at least one side surface oriented at zero degrees with respect to a radial direction, and a chamfer-forming surface extending from the base surface to the side surface such that the chamfer-forming surface forms a first linear edge with the base surface and a second linear edge with the side surface,
wherein the chamfer-forming surface has a height less than a height of the tread imparting structure,
wherein the base surface extends along an entire inner circumference of the mold housing at a substantially uniform height, such that the base surface is configured to form a top surface of a rib in the green tire,
wherein the chamfer-forming surface is oriented at an angle relative to the base surface that varies along a length of the chamfer-forming surface, and
wherein the chamfer-forming surface has a constant height along its length.

20. The tire vulcanization mold of claim 19, wherein the height of the chamfer-forming surface is less than 50% of the height of the tread imparting structure.

* * * * *

UNITED STATES PATENT AND TRADEMARK OFFICE
CERTIFICATE OF CORRECTION

Page 1 of 1

PATENT NO. : 9,079,459 B2
APPLICATION NO. : 11/672280
DATED : July 14, 2015
INVENTOR(S) : Dumigan It is certified that error appears in the above-identified patent and that said Letters Patent is hereby corrected as shown below:

Claims

In column 11, claim 13, In first line delete "8" and insert --9--.

Signed and Sealed this
Twenty-ninth Day of December, 2015

Michelle K. Lee
*Director of the United States Patent and Trademark Office*